United States Patent
Frincu et al.

(10) Patent No.: US 10,277,564 B2
(45) Date of Patent: Apr. 30, 2019

(54) LIGHT-WEIGHT KEY UPDATE MECHANISM WITH BLACKLISTING BASED ON SECRET SHARING ALGORITHM IN WIRELESS SENSOR NETWORKS

(71) Applicant: FREESCALE SEMICONDUCTOR, INC., Austin, TX (US)

(72) Inventors: Andrei Catalin Frincu, Pascani (RO); Georgel Bogdan Alexandru, Bucharest (RO)

(73) Assignee: NXP USA, Inc., Austin, TX (US)

( * ) Notice: Subject to any disclaimer, the term of this patent is extended or adjusted under 35 U.S.C. 154(b) by 226 days.

(21) Appl. No.: 15/297,356

(22) Filed: Oct. 19, 2016

(65) Prior Publication Data

US 2017/0324715 A1    Nov. 9, 2017

(30) Foreign Application Priority Data

May 4, 2016   (RO) ................. A201600313

(51) Int. Cl.
*H04L 29/06* (2006.01)
*H04L 29/08* (2006.01)
(Continued)

(52) U.S. Cl.
CPC .............. *H04L 63/06* (2013.01); *H04L 9/085* (2013.01); *H04L 9/0838* (2013.01); *H04L 63/08* (2013.01);
(Continued)

(58) Field of Classification Search
CPC ... H04L 29/06; H04L 29/08; H04L 29/06721; H04L 29/06666; H04L 29/08531;
(Continued)

(56) References Cited

U.S. PATENT DOCUMENTS

| | | | | |
|---|---|---|---|---|
| 5,625,692 A | * | 4/1997 | Herzberg | ................ H04L 9/085 380/21 |
| 6,182,214 B1 | * | 2/2001 | Hardjono | .................. G06F 1/24 713/613 |

(Continued)

FOREIGN PATENT DOCUMENTS

CN   101977384 A   2/2011

OTHER PUBLICATIONS

Goubin L., Martinelli A. (2011) Protecting AES with Shamir's Secret Sharing Scheme. In: Preneel B., Takagi T. (eds) Cryptographic Hardware and Embedded Systems—CHES 2011. CHES 2011. Lecture Notes in Computer Science, vol. 6917. Springer, Berlin, Heidelberg (Year: 2011).*

(Continued)

*Primary Examiner* — Ali S Abyaneh

(57) ABSTRACT

Various embodiments include a network manager for managing network keys in a network having a plurality of nodes, the device including: a memory; and a processor configured to: determine N nodes to blacklist, wherein N is an integer; select a polynomial function from a plurality of polynomial functions of degree K and wherein the polynomial functions define plurality of secret network keys; generate K-N random abscissa values, wherein none of the random abscissa values are not found in a list of node abscissa values; calculate K-N polynomial function values for the K-N random abscissa values; calculate N polynomial function values for N node abscissa values associated with the N blacklisted nodes; transmit a message to nodes in the network including an indication of the selected polynomial function, the K-N random abscissa values, the N node abscissa values associated with the N blacklisted nodes, the K-N calculated polynomial function values, and the N calculated polynomial function values.

16 Claims, 6 Drawing Sheets

(51) Int. Cl.
*H04W 12/04* (2009.01)
*H04L 9/08* (2006.01)
*H04L 9/30* (2006.01)

(52) U.S. Cl.
CPC ............ *H04L 63/101* (2013.01); *H04L 67/10* (2013.01); *H04L 67/12* (2013.01); *H04W 12/04* (2013.01); *H04L 9/3093* (2013.01); *H04L 2209/805* (2013.01)

(58) Field of Classification Search
CPC . H04L 9/30; H04L 9/3093; H04L 9/32; H04L 9/3026; H04L 9/14; H04L 9/0819; H04L 9/0822; H04L 9/0833; H04L 9/083; H04L 9/085; H04L 9/0891; H04L 63/0435; H04L 63/0407; H04L 63/06; H04L 63/062; H04L 63/083; H04L 63/08; H04L 9/3294; H04L 9/08; H04L 9/3268; H04W 12/04; G06F 21/31
See application file for complete search history.

(56) References Cited

U.S. PATENT DOCUMENTS

| | | | |
|---|---|---|---|
| 6,937,728 B1* | 8/2005 | Abe | H04N 7/167 380/237 |
| 7,665,126 B2 | 2/2010 | Simon et al. | |
| 8,087,085 B2 | 12/2011 | Hu et al. | |
| 8,713,329 B2 | 4/2014 | Schneider | |
| 8,959,333 B2 | 2/2015 | Falk et al. | |
| 9,215,219 B1* | 12/2015 | Krendelev | H04L 63/0637 726/22 |
| 9,489,522 B1* | 11/2016 | El Defrawy | G06F 21/606 726/26 |
| 2006/0126848 A1* | 6/2006 | Park | H04L 9/00 380/277 |
| 2008/0178294 A1 | 7/2008 | Hu et al. | |
| 2008/0181398 A1* | 7/2008 | Pappu | H04L 9/00 380/44 |
| 2009/0307483 A1 | 12/2009 | Falk et al. | |
| 2010/0054480 A1 | 3/2010 | Schneider | |
| 2010/0177890 A1* | 7/2010 | Ghouti | H04L 9/30 380/30 |
| 2013/0259230 A1 | 10/2013 | Polo et al. | |
| 2015/0098566 A1 | 4/2015 | Takashima et al. | |

OTHER PUBLICATIONS

Enjian Bai, Xueqin Jiang (Mar. 2013) A Dynamic Key Management Scheme Based on Secret Sharing for Hierarchical Wireless Sensor Networks. TELKOMNIKA, vol. 11, No. 3, Mar. 2013, pp. 1514-1523 (Year: 2013).*

Yan-xiao Liu et al. (Oct. 11, 2012) Verifiable symmetric polynomial-based key distribution schemes. Security Comm. Networks 2013, Wiley Online Library (wileyonlinelibrary.com) (Year: 2012).*

Yanji Piao et al. (2013) Polynomial-based key management for secure intra-group and inter-group communication. Elsevier vol. 65, Issue 9, May 2013, pp. 1300-1309 (Year: 2013).*

Berkovits, Shimshon et al; "How to Broadcast a Secret"; Advances in Cryptology Eurocrypt 91, Springer, Berlin, Heidelberg, Berlin; pp. 535-541; (Apr. 8, 1991).

Sanchez, D.S. et al; "A Deterministic Pairwise Key Pre-distribution Scheme for Mobile Sensor Networks"; IEEE SecureComm2005; pp. 277-288 (Sep. 5, 2005).

Shamir, Adi; "How to Share a Secret"; Communications of the ACM, vol. 22, No. 11; 2 pages (Nov. 1979).

Bansal, Divya et al; "Threshold based Authorization model for Authentication of a node in Wireless Mesh Networks"; Int. J. of Advanced Networking and Applications, vol. 01, Is.

Naor, Moni et al; "Efficient Trace and Revoke Schemes"; Int. J. Inf. Secur. 9:411-424; 14 pages (2010).

* cited by examiner

US 10,277,564 B2

LIGHT-WEIGHT KEY UPDATE MECHANISM WITH BLACKLISTING BASED ON SECRET SHARING ALGORITHM IN WIRELESS SENSOR NETWORKS

TECHNICAL FIELD

Various embodiments disclosed herein relate generally to network security.

CROSS-REFERENCE TO RELATED APPLICATIONS

This application claims the priority under 35 U.S.C. § 119 of Romania patent application no. A201600313, filed May 4, 2016 the contents of which are incorporated by reference herein.

BACKGROUND

Key distribution in networking has many different types of networks and cryptographic systems to account for. In public key cryptography, both a public and private key pair are distributed, the private key being specific to the intended recipient. The private key may be used for decryption, while the public key may be used for encryption of data. Symmetric key encryption schemes are different in the sense that they use the same key on both sides of the communication at the recipient as well as at the sender's end. Similarly, the same key is used for both encryption as well as decryption in symmetric key algorithms.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a network manager for managing network keys in a network having a plurality of nodes, the device comprising: a memory; and a processor configured to: determine N nodes to blacklist, wherein N is an integer; select a polynomial function from a plurality of polynomial functions of degree K and wherein the polynomial functions define plurality of secret network keys; generate K-N random abscissa values, wherein none of the random abscissa values are not found in a list of node abscissa values; calculate K-N polynomial function values for the K-N random abscissa values; calculate N polynomial function values for N node abscissa values associated with the N blacklisted nodes; transmit a message to nodes in the network including an indication of the selected polynomial function, the K-N random abscissa values, the N node abscissa values associated with the N blacklisted nodes, the K-N calculated polynomial function values, and the N calculated polynomial function values.

Various embodiments described herein relate to a node in a network having a plurality of nodes, the device including: a memory; and a processor configured to: receive a message including an indication of a selected polynomial function, K abscissa values, and the K selected polynomial function values, wherein the selected polynomial function has an degree of K and wherein the selected polynomial function defines a current secret network key; determine the coefficients of the selected polynomial function based upon K abscissa values, the K selected polynomial function values, and a node abscissa value; and determine the current secret network key based upon the determined coefficients.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

In the Internet of Things (IoT) era, sensor network nodes are sometimes resource-constrained and need reduced computational effort. Security mechanisms which ensure key updates should be light-weight, fast, and efficient. A scenario where the network key needs to be updated manually for each node might prove sometimes inefficient and even insecure. For example, even if an attacker is detected, severe damage could be inflicted until the entire network is up to date with the new network key.

Embodiments enhance the development of light-weight mesh networks (including sensor networks). The necessity of fast key update and removal of compromised nodes without significant intervention from the network manager are desired since, from a security point of view, network members are identical.

Embodiments include systems and methods which allow network managers to efficiently refresh the network key, including when one or more nodes may be compromised. Some embodiments include implementations on mesh networks.

Embodiments may include a provisioning stage where a coordinator device, hereinafter called network manager, may supply each enrolled node with a pool of points $P_N$ which are calculated using N polynomial splitter functions of degree k.

Additional embodiments may include a key update stage where the network manager may broadcast a signed and authenticated packet into the network, containing information that allows only specific devices to derive a new network key based on a secret sharing algorithm, for example, Shamir's Secret Sharing algorithm, thus effectively blacklisting the compromised nodes without explicitly informing the network about their identity.

Figure 1:
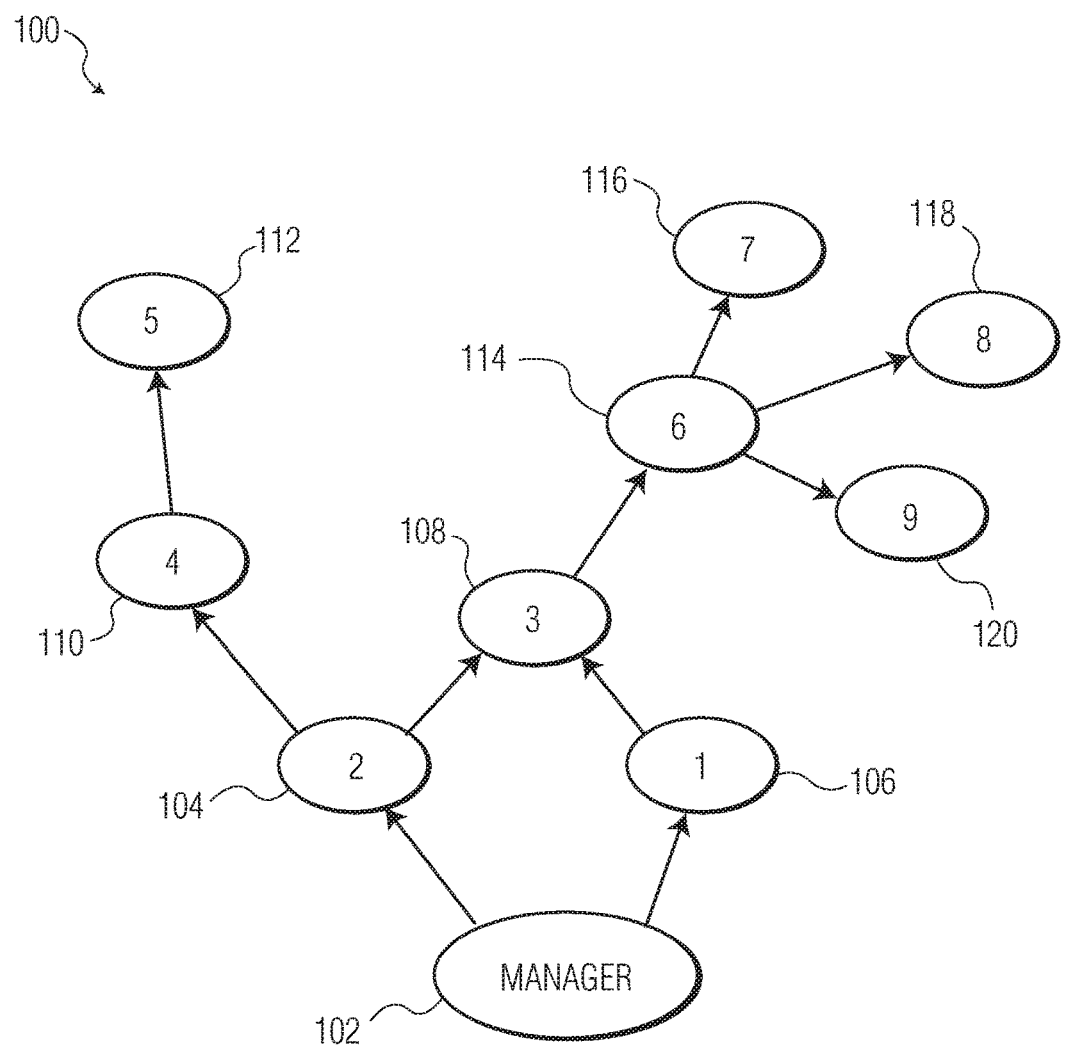
FIG. 1 illustrates a system network diagram.

FIG. 1 illustrates a system network diagram 100. System network diagram 100 may include manager 102 and nodes 104-120. The connections in system network diagram 100 may be any kind of telecommunications network topology such as a mesh network, ring, star, fully connected, line, or tree. Similarly, the technologies used for the network may be any kind of wired or wireless technologies such as, Local Area Network (LAN), Asynchronous Transfer Mode (ATM), Wireless LAN (WiFi), Internet Protocol (IP), and Long Term Evolution (LTE), for example.

Manager 102 may be a server, computer, personal computer, data center, blade, tablet device, or personal phone, for example. Nodes 102-120 may similarly be any of a server, computer, personal computer, data center, blade, tablet device, or personal phone. In one example, manager 102 may be a server blade in a data center. In this non-limiting example, each of nodes 102-120 may be servers in data centers located in different cities. In another example, all of nodes 102-120 and manager 102 may be located in the same center, such as a university, while each node may reflect a different server for that university.

Manager 102 may manage and distribute a key system such as a private key infrastructure. Manager 102 may store a table and/or data structure to identify current and past keys as well as nodes which are assigned to those keys. This may be applied for a public as well as a private key infrastructure. The data structures may include any of a tree, a binary tree, a hash, an array, a class or a database, for example.

Figure 2:
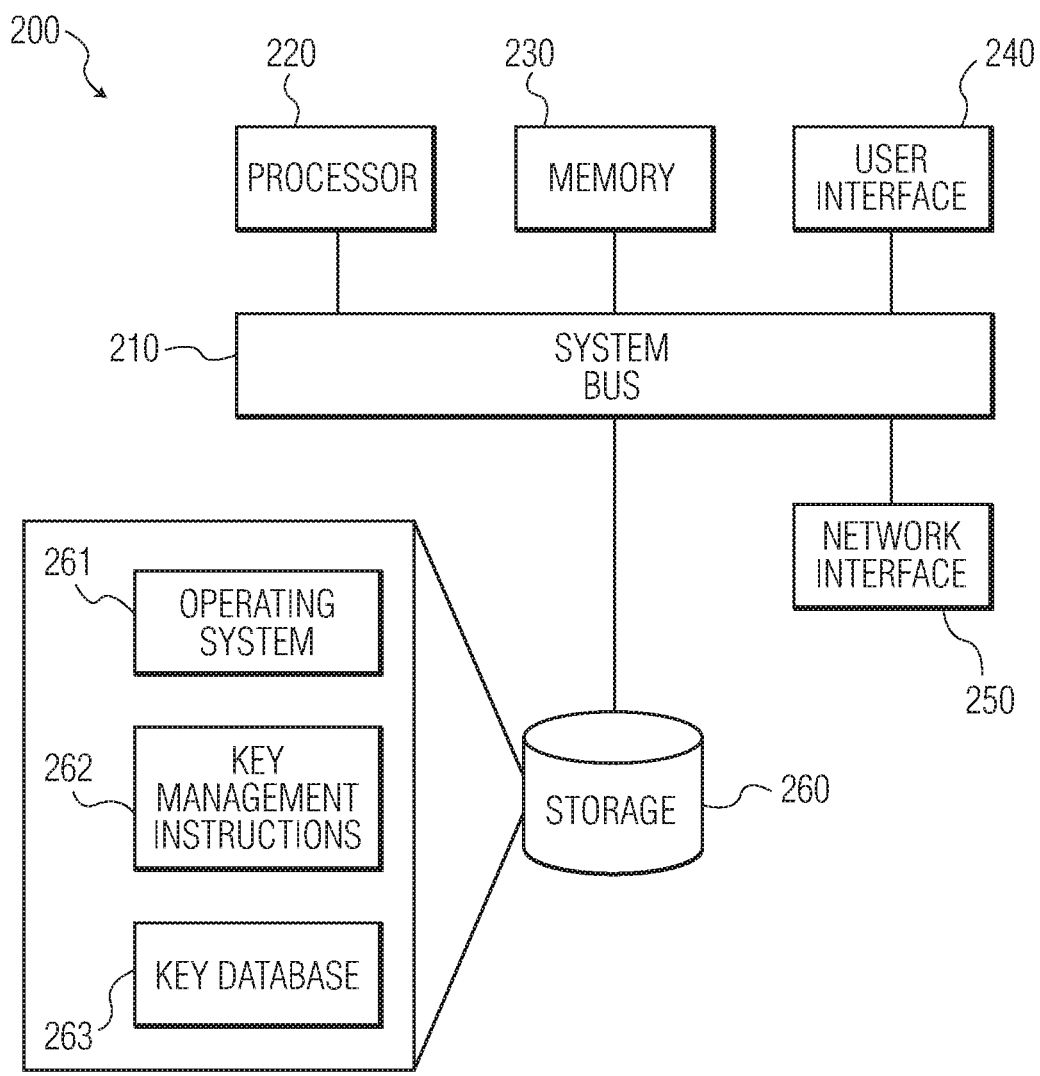
FIG. 2 illustrates a system diagram.

FIG. 2 illustrates a hardware diagram 200 for implementing a manager or a node. The hardware 200 may correspond to one or more nodes 104-120 or manager 102 of FIG. 1. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. The storage 260 may store key management instructions 262 for managing the public or private key storage, distribution and updating. The storage 260 may store a key database 263 such as one of the data structures previously mentioned.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

Provisioning

The number of key updates using embodiments of the method may be limited by the storage capabilities of devices participating in the mesh. The manager may use an algorithm based on Shamir's Secret Sharing method which may imply the use of (at least) a polynomial splitter function $F_i$ of degree k. Other known secret sharing methods may be used as well with the embodiments described here. The network key that will be used at the $i^{th}$ key update may be $F_i(0)$. The value of k may be selected depending on the protocol's payload limitations, security requirements and blacklisting efficiency, for example. Since multiple key updates may be required during a network's life cycle, the Manager may store a table of polynomial functions (PFT) of size N (containing, for example, $F_i$, i ranging from 1 to N).

In a provisioning stage a node m may be added to the mesh network over a protocol-specific secure link. The Manager may send the current network key and iterate throughout the PFT using an abscissa value that was not previously used for any other node, to obtain a unique point on each function that resides in PFT. This operation results in a table of $P_N$ points (PT). PT may be sent to the enrolled device, while the Manager may store an abscissa, node address pair in a separate table (AAT).

Figure 3:
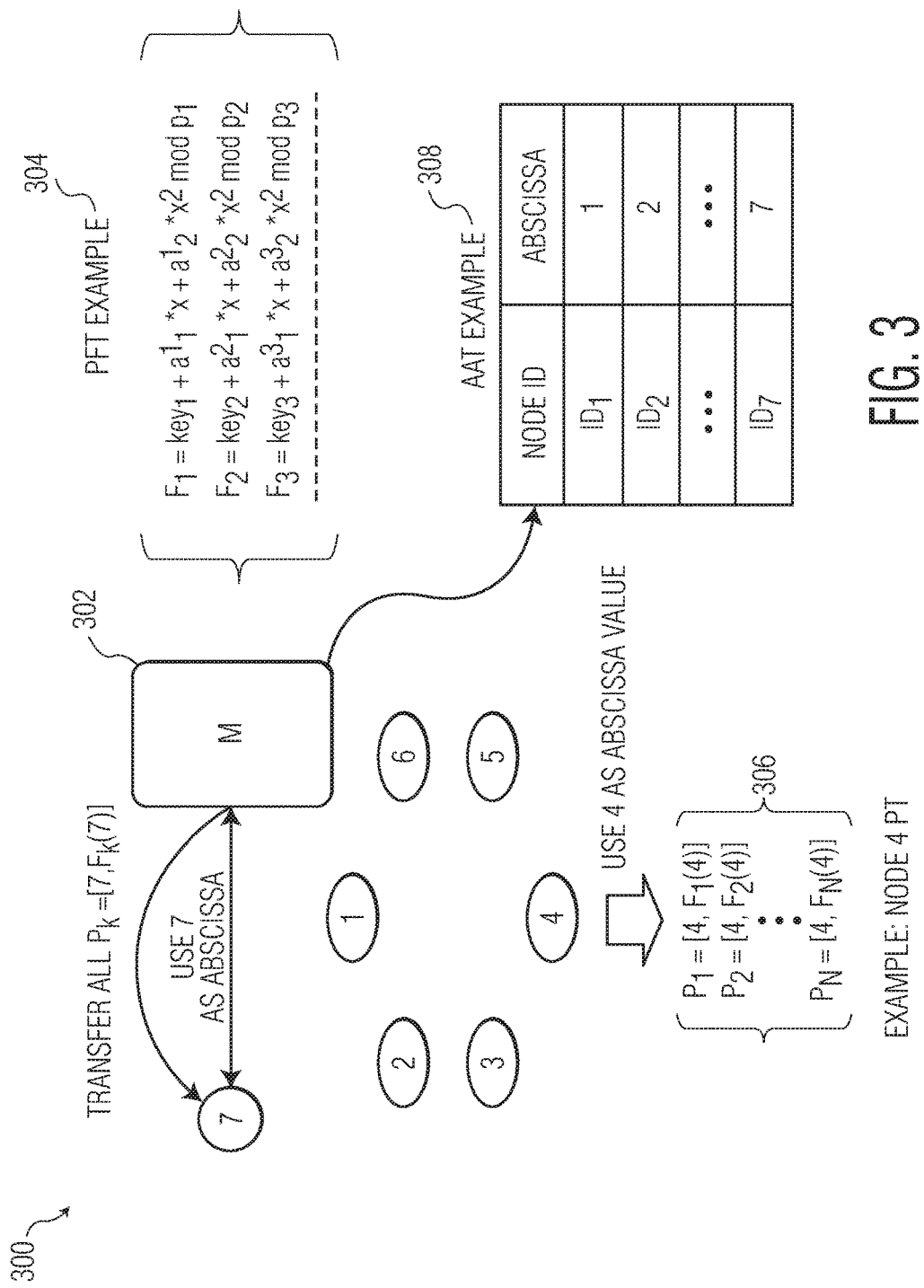
FIG. 3 illustrates a provisioning.

FIG. 3 illustrates a provisioning 300. Provisioning 300 may include manager 302, example PFT 304, example PT 306, and example AAT 308. In provisioning 300, manager 302 may use a new value of 7 as an abscissa to transfer $P_k=[7, F_k(7)]$. Example PFT 304 illustrates a polynomial function table, which a manager may choose a polynomial function from. In example 304, 3 polynomial functions are illustrated. In embodiments, a PFT such as example PFT 304 may be stored on manager 302. Manager 302 may similarly store an address abscissa table such as example AAT 308. In example AAT 308, a simplified table illustrating node identifications (ID) each associated with an abscissa.

Example PT 306, illustrates a node network with 6 nodes. Example PT 306 uses 4 as an abscissa value to create a point table with several points using 4 as the abscissa.

Key Updating

In a mesh network key update stage, a Manager may have to renew the network key and, if needed, to blacklist a certain node.

Key renewal without blacklisting may be carried out as follows:

In a secret sharing algorithm if a polynomial function of degree k is used to protect a secret, then k+1 points must be known so that, using Lagrange's Interpolation, the splitter function can be reconstructed and therefore $F_i(0)$=secret may be retrieved.

After secret has been retrieved, the new network key may be derived using a hash-based key derivation function: NK=KDF (secret).

To begin a key renewal procedure, a manager may broadcast a signed and authenticated message in the mesh which contains k unique points, calculated using a polynomial function from PFT, by using abscissa values which were not distributed to any node or are not present in the AAT.

Each node may now have k+1 points on $F_i$ and may be capable of retrieving the new network key, i.e., calculating $F_i(0)$=secret.

Blacklisting a node a node may be carried out as follows:

A similar procedure to that of key renewal described above may be used when a node must be blacklisted. Instead of calculating k unique points, i.e., points that are not equal to any of the abscissa values associated with a node, a manager may issue k−1 unique points. The $k^{th}$ point may be calculated using the abscissa in the AAT which was provisioned to the node that should be blacklisted.

All the nodes in the mesh network may receive k+1 unique points, except that the blacklisted node will obtain k unique points and may not be capable of retrieving the new network key.

Figure 4A:
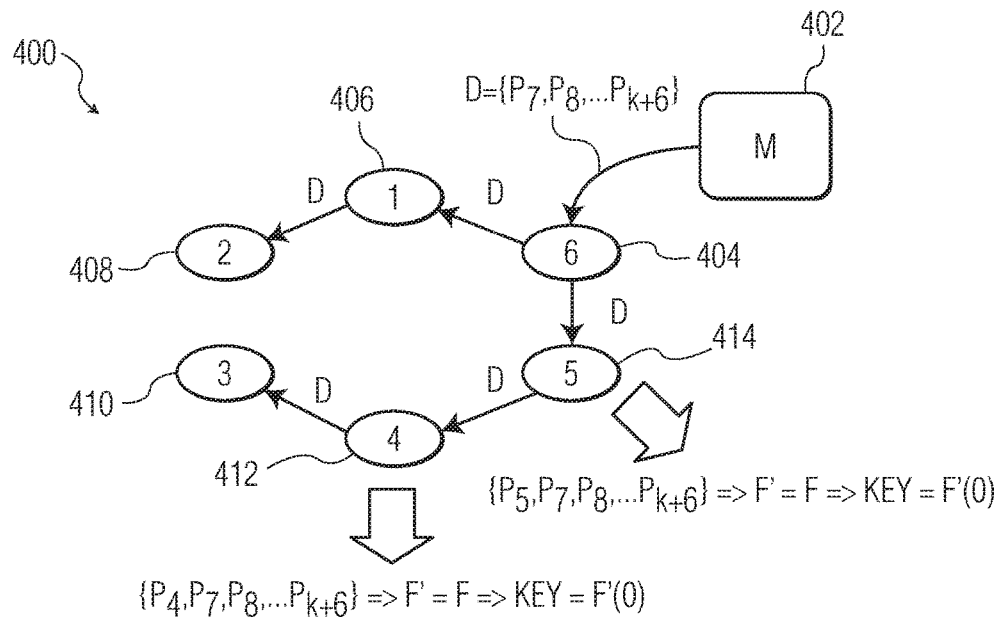
FIG. 4*a* illustrates a key update stage without blacklisting.

FIG. 4a illustrates a key update stage without blacklisting 400. Key update stage without blacklisting 400 may include manager 402 and nodes 404-414. Manager 402 may send a data packet D including pool of points $P_7$ through $P_{K+6}$ to node 404. Node 404 may send the same data packet D to node 414. Node 414 may extract the points from the pool of points and add its own point $P_5$. Node 414 may generate the new key from the pool of points as applied to the relevant polynomial function for this iteration of key updates. Node 414 may then send the data packet D to node 412 for similar abscissa and point extraction, as well as key generation. This method may be used as an alternate channel to send the new network key in case the current key is considered weak and an attacker may know sufficient information to compromise network security.

Figure 4B:
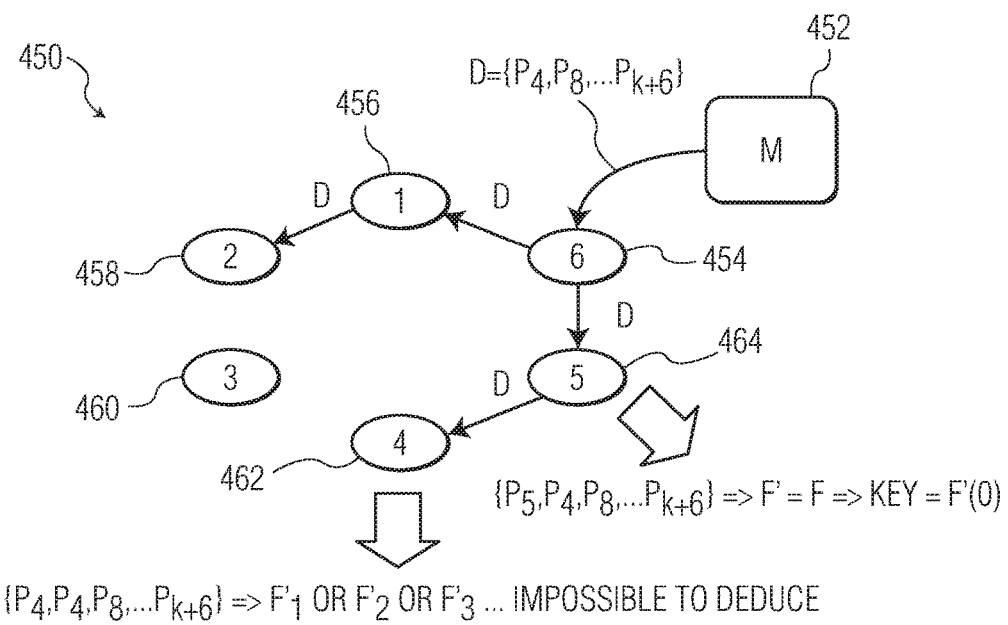
FIG. 4*b* illustrates a key update stage with blacklisting.

FIG. 4b illustrates a key update stage with blacklisting 450. Key update stage with blacklisting 450 may include manager 452 and nodes 454-464. In key update stage with blacklisting 450 node 462 may be blacklisted and unable to reproduce a new network key and because it is not able to evaluate the most current polynomial function. In key update stage with blacklisting 450 manager 452 may send a data packet to node 454 including a pool of points with abscissa $P_4$, $P_8$, . . . up to $P_{K+6}$. Similarly, node 454 may transmit to node 464 the data packet. Node 464 may be able to withdraw the pool of points $P_5$, $P_4$, $P_8$, . . . $P_{K+6}$ and generate a key from the secret information related to the polynomial. Node 464 also sends the data packet D to node 462. Because $P_4$ is included in the data packet, node has two copies of $P_4$, and thus is not able to reconstruct the most current polynomial function (because it only has k unique points and k+1 points are needed), and hence, node 462 cannot determine the secret information needed to generate the new network key. This results in the node 462 being blacklisted. Node 462 also sends the packet D on to node 460.

Figure 5:
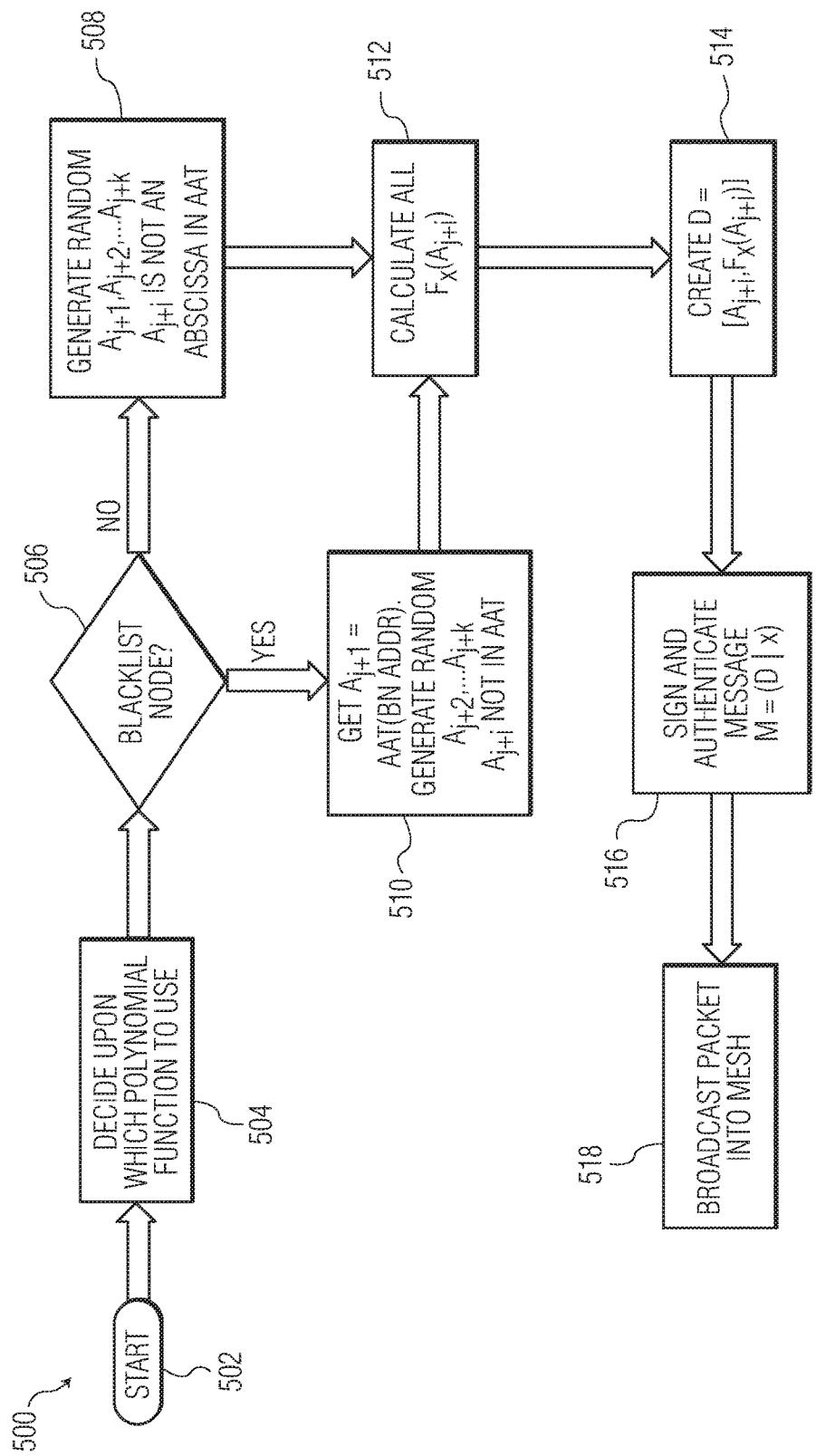
FIG. 5 illustrates a method for handling a key update by a manager.

FIG. 5 illustrates a method for handling a key update by a manager 500. Manager 102 may begin in step 502 when it is determined that a key update is required and proceed to step 504.

In step 504 manager 102 may determine which polynomial function to use as indicated by x. In determining which polynomial function to use, manager 102 may access the PFT. The PFT may contain several different polynomial functions. An index may be maintained and communicated that indicates which of the polynomial functions to use. When a polynomial function has been chosen, manager 102 may proceed to step 506.

In step 506 manager 102 may determine whether to blacklist one or more nodes. When manager 102 determines to perform a key refresh without blacklisting any nodes, the manager may proceed to step 508, and when the manager determines it should perform a node blacklisting it proceeds to step 510.

In step 508 the manager may generate k abscissa values which are not currently in its abscissa-node address table (AAT). Once the random abscissa values are generated, manager 102 may proceed to step 512.

In step 510 the manager may extract an abscissa $A_{j+1}$ from the AAT based on the address of the node to be blacklisted. Additionally, the manager may generate k−1 random abscissa values which are not presently in the AAT and proceed to step 512.

In step 512 the manager may calculate the relevant polynomial splitter function value $F_x$ for the new abscissa values $A_{j+1}, \ldots, A_{j+i}$. The manager may then proceed to step 514.

In step 514 manager 102 may create a data packet D which includes the new abscissa values $A_{j+i}$, and new polynomial splitter function values for the newly abscissa values $F_x(A_{j+i}$. The manager may then proceed to step 516.

In step 516 manager 102 may sign and authenticate the message m, that includes D and the index x indicating the polynomial function used that corresponds to entry x in the PFT at each node.

The manager may then proceed to step 518 where it may broadcast the packet into the mesh as depicted in FIGS. 1, and 4a-4b.

Figure 6:
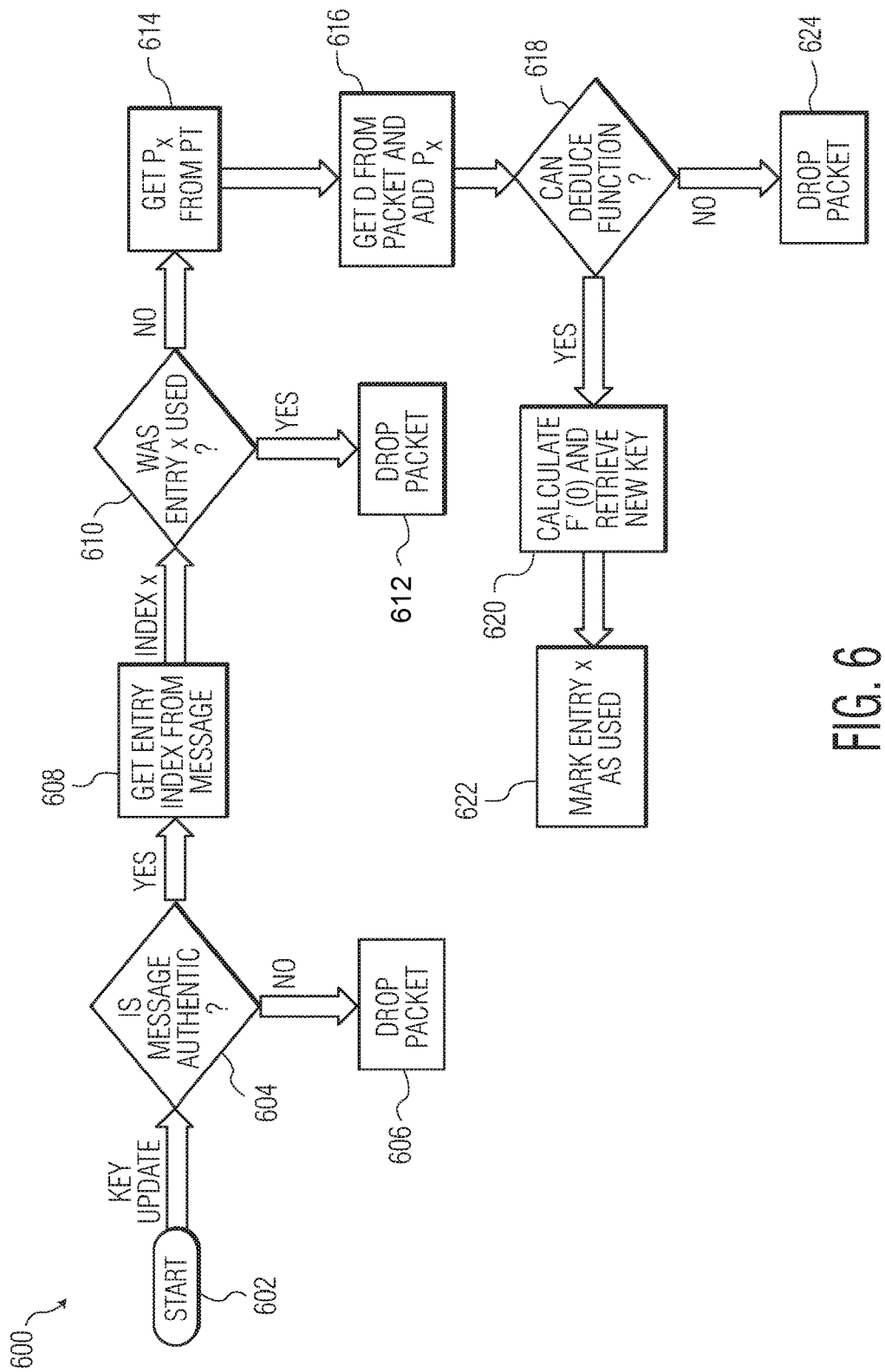
FIG. 6 illustrates a method for handling a key update by a node.

FIG. 6 illustrates a method for handling a key update by a node 600. Any of nodes 104-120 may perform method 600. The node may begin in step 602 when a key update is required and proceed to step 604.

In step 604 the node may determine whether or not the message is authentic. When the message is determined not to be authentic the node may proceed to step 606 where it may drop the packet. When the message is determined to be authentic, it may proceed to step 608.

In step 608 the node may retrieve the index x from the message and proceed to step 610.

In step 610 the node may determine whether entry x was used. When entry x is determined to be used, then the node may proceed to step 612 where it may drop the packet. When entry x was not determined to be used, the node may proceed to step 614.

In step 614, the node may retrieve the point $P_x$ from the point table PT and proceed to step 616.

In step 616 the node may retrieve D from the packet generated in step 514, and thereafter add the pool of points $P_X$ previously retrieved. The node may then proceed to step 618.

In step 618 the node may determine whether it can deduce the polynomial function or not. When the node cannot deduce the polynomial function, this indicates that the node is blacklisted. In this case, the node may proceed to step 624 where it may drop the packet. When the node is able to decipher and calculate accurately the polynomial function, this indicates a key refresh and that the node is active. The active node proceeds to step 620.

In step 620 the node may reconstruct the new polynomial splitter function F' and then evaluate F'(0) and therefore retrieve the new key. Once the function is calculated and the new key retrieved, the node may proceed to step 622 where it may mark the entry x used in its local storage.

Collisions may be avoided by adding an index in the packet payload, resembling the index of the polynomial function from the PFT which is used at the current key update sequence.

Since the key pool may be limited, scenarios where multiple nodes may be blacklisted simultaneously may desirable. The feature of blacklisting multiple nodes may be closely related to the degree of the polynomial functions, and therefore the number of points needed to reconstruct a key. For example if the function's degree is two, three points will be needed to reconstruct the key. Since each node already owns one point, at a certain key renewal stage, only two nodes may be blacklisted simultaneously. Accordingly, the degree of the polynomial functions will be selected to accommodate the number of nodes to be blacklisted.

It should be apparent from the foregoing description that various exemplary embodiments of the invention may be implemented in hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A device configured to manage network keys in a network having a plurality of nodes, the device comprising:
   a memory; and
   a processor configured to determine N nodes to blacklist, wherein N is an integer, extract, for each of the N nodes to blacklist, a respective abscissa from an Abscissa-node Address Table (AAT), blacklist the determined N nodes, select a polynomial function from a plurality of polynomial functions of degree K, wherein the plurality of polynomial functions define a plurality of secret network keys, generate K-N random abscissa values, wherein none of the K-N random abscissa values are found in the AAT, calculate K-N polynomial function values for the K-N random abscissa values, calculate N polynomial function values for N node abscissa values respectively associated with the N blacklisted nodes, and transmit a message to nodes in the network including an indication of the selected polynomial function, the K-N random abscissa values, the N node abscissa values respectively associated with the N blacklisted nodes, the K-N calculated polynomial function values, and the N calculated polynomial function values.

2. The device of claim 1, wherein the processor is further configured to provision a new node including:
   selecting a new node abscissa value, wherein a new node abscissa value is not found in the AAT;
   calculating a plurality of new polynomial function values by evaluating the plurality of polynomial functions at the new abscissa value; and
   sending the new abscissa value and the plurality of new polynomial functions values to the new node.

3. The device of claim 1, wherein the processor is further configured to sign and authenticate the transmitted message.

4. The device of claim 1, wherein the plurality of polynomial functions are part of a secret sharing method.

5. The device of claim 4, wherein the secret sharing method is Shamir's secret sharing method.

6. The device of claim 1, wherein zero degree coefficients of the plurality of polynomial functions respectively correspond to the plurality of secret network keys.

7. The device of claim 1, wherein N equals 0 indicates that no nodes are blacklisted.

8. The device of claim 1, wherein the processor is further configured to: receive a message including an indication of a selected polynomial function from a plurality of polynomial functions, K abscissa values, and K selected polynomial function values, wherein the selected polynomial function has a degree of K and wherein the selected polynomial function defines a current secret network key, determine coefficients of the selected polynomial function based upon the K abscissa values, the K selected polynomial function values, and a node abscissa value; and determine the current secret network key based upon the determined coefficients.

9. The device of claim 8, wherein zero degree coefficients of the plurality of polynomial functions respectively correspond to the plurality of secret network keys.

10. The device of claim 8, wherein the processor is further configured to determine whether the received message is authentic.

11. The device of claim 8, wherein the processor is further configured to drop the received message when the selected polynomial function has been previously used.

12. The device of claim 8, wherein the processor is further configured to store an indication that the selected polynomial function has been previously used.

13. The device of claim 8, wherein the processor is further configured to drop the received message when the coefficients of the selected polynomial function cannot be determined.

14. The device of claim 8, wherein the plurality of polynomial functions are part of a secret sharing method.

15. The device of claim 14, wherein the secret sharing method is Shamir's secret sharing method.

16. The device of claim 8, wherein determining the current secret network key based upon the determined coefficients includes evaluating the selected polynomial function for an input of 0.

* * * * *